(12) United States Patent
Kuwabara et al.

(10) Patent No.: US 8,888,168 B2
(45) Date of Patent: Nov. 18, 2014

(54) FRONT VEHICLE BODY STRUCTURE

(71) Applicant: Fuji Jukogyo Kabushiki Kaisha, Tokyo (JP)

(72) Inventors: Mitsumasa Kuwabara, Tokyo (JP); Hiroyuki Matsuda, Tokyo (JP); Yutaka Miyata, Tokyo (JP); Yusuke Takagi, Tokyo (JP); Tomohiro Hosokawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/834,141

(22) Filed: Mar. 15, 2013

(65) Prior Publication Data

US 2013/0320709 A1    Dec. 5, 2013

(30) Foreign Application Priority Data

Mar. 29, 2012    (JP) .................................. 2012-076579

(51) Int. Cl.
*B62D 21/15*    (2006.01)
*B62D 25/08*    (2006.01)

(52) U.S. Cl.
CPC ............ *B62D 21/152* (2013.01); *B62D 25/082* (2013.01)
USPC ................................. 296/187.09; 296/187.1

(58) Field of Classification Search
USPC ......................................... 296/187.09, 187.1
See application file for complete search history.

(56) References Cited

U.S. PATENT DOCUMENTS

| | | | | |
|---|---|---|---|---|
| 4,358,152 A | * | 11/1982 | Mayer et al. | 296/187.09 |
| 4,900,082 A | * | 2/1990 | Schwuchow et al. | 296/203.02 |
| 6,957,846 B2 | * | 10/2005 | Saeki | 296/187.1 |
| 2012/0248820 A1 | * | 10/2012 | Yasui et al. | 296/187.09 |

FOREIGN PATENT DOCUMENTS

JP          63-145764 U       9/1988

* cited by examiner

*Primary Examiner* — Joseph D Pape
(74) *Attorney, Agent, or Firm* — Smith, Gambrell & Russell, LLP

(57) ABSTRACT

There is provided a front vehicle body structure. The structure includes a front-side frame which is disposed on each side of a power unit in a vehicle width direction, and extends in a fore-and-aft direction; and a load-transfer member disposed outside in the width direction, near a front-end of the front-side frame, a rear end of the load-transfer member being fixed to a certain position of a outer lateral side of the front-side frame in the width direction, the certain position being located forwardly of a center of the power unit in the fore-and-aft direction, a front-end of the load-transfer member being disposed forwardly and outwardly of the rear end. A load to the front-end of the load-transfer member in a rearward direction of the vehicle causes a vicinity area of the fixed position to be displaced in a direction in which the vicinity area approaches the power unit.

21 Claims, 7 Drawing Sheets

FRONT VEHICLE BODY STRUCTURE

CROSS-REFERENCE TO RELATED APPLICATIONS

The present application claims priority from Japanese Patent Application No. 2012-076579 filed on Mar. 29, 2012, the entire contents of which are hereby incorporated by reference.

BACKGROUND OF THE INVENTION

1. Field of the Invention

The present invention relates to a front body structure of a vehicle such as an automobile, and particularly, to a front body structure having an improved performance against a small overlap offset collision.

2. Description of the Related Art

Safety against an offset collision has been demanded of the body structure of a vehicle such as an automobile, the offset collision being such that a side portion of the vehicle collides with an object. In recent years, particularly, an improved performance for a so-called small overlap collision in the offset collision has been demanded of the body structure of a vehicle, the small overlap collision being such that only a side portion of the vehicle in the vehicle width direction collides with an object.

In a full-lap collision in which the entire front end of the vehicle collides, or an offset collision with a relatively large overlap, absorption of energy and load transfer in the rear direction of the vehicle can be performed using the front of a front side frame which is disposed extending in the fore-and-aft direction of the vehicle along the side of the engine compartment. However, in the case of a small overlap offset collision (which is a collision such that only the outside portion of the front side frame collides with an object), a structure is needed that can absorb and transfer energy without depending on the front end portion of the front side frame.

For example, Japanese Unexamined Patent Application Publication No. S63-145764 describes a technology for improving the strength of the area outside the side frame of the vehicle body, the technology providing an obliquely disposed reinforcement member which connects between the rear surface of the cross member provided at the back of the front wheels and the side floor frame at the back of the rear surface.

However, when the cabin itself is reinforced with the reinforcement member to obtain sufficient collision safety performance like the above-described conventional technology, it is necessary to absorb and transfer energy without depending on the front side frame, and thus a significant increase in vehicle weight and cost occurs, thereby impairing the driving performance as well as the fuel consumption performance of the vehicle. It is an object of the present invention to provide a front body structure having a simple and light configuration which improves performance against a small overlap offset collision.

SUMMARY OF THE INVENTION

The present invention has been designed in consideration of the circumstances described above. A first aspect of the present invention is a front vehicle body structure including a front side frame disposed at a front of a vehicle body on each side of a power unit in a vehicle width direction, the front side frame extending substantially in a fore-and-aft direction of the vehicle; and a load transfer member disposed outside in the vehicle width direction, near a front end of the front side frame, a rear end of the load transfer member being fixed to a certain position of a outer lateral side of the front side frame in the vehicle width direction, the certain position being located forwardly of a center position of the power unit in the fore-and-aft direction, a front end of the load transfer member being disposed forwardly of the rear end in the fore-and-aft direction and outwardly of the rear end in the vehicle width direction. An impact load to the front end of the load transfer member in a rearward direction of the vehicle causes a vicinity area of the fixed position of the front side frame to the rear end to be displaced in a direction in which the vicinity area approaches the power unit. With the above structure, an input load applied to the front end of the load transfer member at the time of a small overlap collision causes the front side frame to be deformed, so that the inner lateral side of the front side frame pushes a power unit such as an engine toward the opposite side of the vehicle in the vehicle width direction. The power unit, i.e., a heavy load is pushed toward the side of the vehicle opposite to the collided object, and thus the driving direction of the vehicle is changed to a direction in which a frontal collision of the vehicle with the collided object is avoided. Such a movement of the vehicle is intended to reduce an impact load to the cabin where a driver rides in. In addition, bending and deformation of the front side frame provides an energy absorption effect. Thus it is possible to provide a front body structure having a simple and light configuration which improves performance against small overlap offset collision.

Preferably, the front side frame has a low-stiffness portion which is formed rearwardly of the fixed position and configured to allow the front side frame to bend easily, the rear end of the load transfer member being fixed at the fixed position to the lateral outer side of the front side frame in the vehicle width direction. With the above structure, the front side frame is bent in a predetermined deformation mode at the time of a small overlap collision, and thus the above-described effect can be reliably obtained. As the low-stiffness portion, it is possible to use, for example, a bead-like groove which is formed by depressing the lateral side of the front side frame and which extends substantially in the vertical direction.

Preferably, the front vehicle body structure further includes a mounting base which is provided across the power unit and the front side frame and configured to support the power unit, the mounting base being located at substantially the same position as the rear end of the load transfer member in the fore-and-aft direction of the vehicle. With the above structure, the mounting base is pushed inward in the vehicle width direction by the bending of the front side frame, and thus the above-described effect can be reliably obtained.

Preferably, a separator which substantially blocks the inside of the front side frame is provided at a position adjacent to the fixed position, the rear end of the load transfer member being fixed at the fixed position to the lateral outer side of the front side frame in the vehicle width direction. With the above structure, cross-section retaining function and stiffness of the front side frame at the position through which a load is transferred to the power unit from the load transfer member can be enhanced, and thus the above-described effect can be promoted.

Preferably, the front end of the load transfer member is disposed to be opposed to and spaced apart from a rear surface of a front bumper beam. With the above structure, at the time of a light collision in which a vehicle collides with a very low speed, the front side frame and the like is prevented from being damaged because an impact load is received by the load transfer member, and thus a collision repair can be easily made and the repair cost can be reduced.

Preferably, the front vehicle body structure further includes a front sub frame fixed to a lower side of the front side frame, other fixed position at a front side of the front sub frame to the front side frame being located rearward relative to the fixed position of the front side frame to the rear end of the load transfer member. With the above structure, the front sub frame is prevented from interfering with the above-described bending and deformation of the front side frame, and thus the above-described effect can be reliably obtained.

DESCRIPTION OF THE PREFERRED EMBODIMENTS

Again it is an object of the present invention to provide a front body structure having a simple and light configuration which improves performance against a small overlap offset collision, and the present invention achieves the object by providing a load transfer gusset outwardly of the front part of the front frame in the vehicle width direction, the load transfer gusset causing the front side frame to bend inward in the vehicle width direction by an input load at the time of a collision, thereby pushing the power train such as an engine via the front side frame to the front side frame on the opposite side and controlling the driving direction of the vehicle.

Embodiment 1

Figure 1:
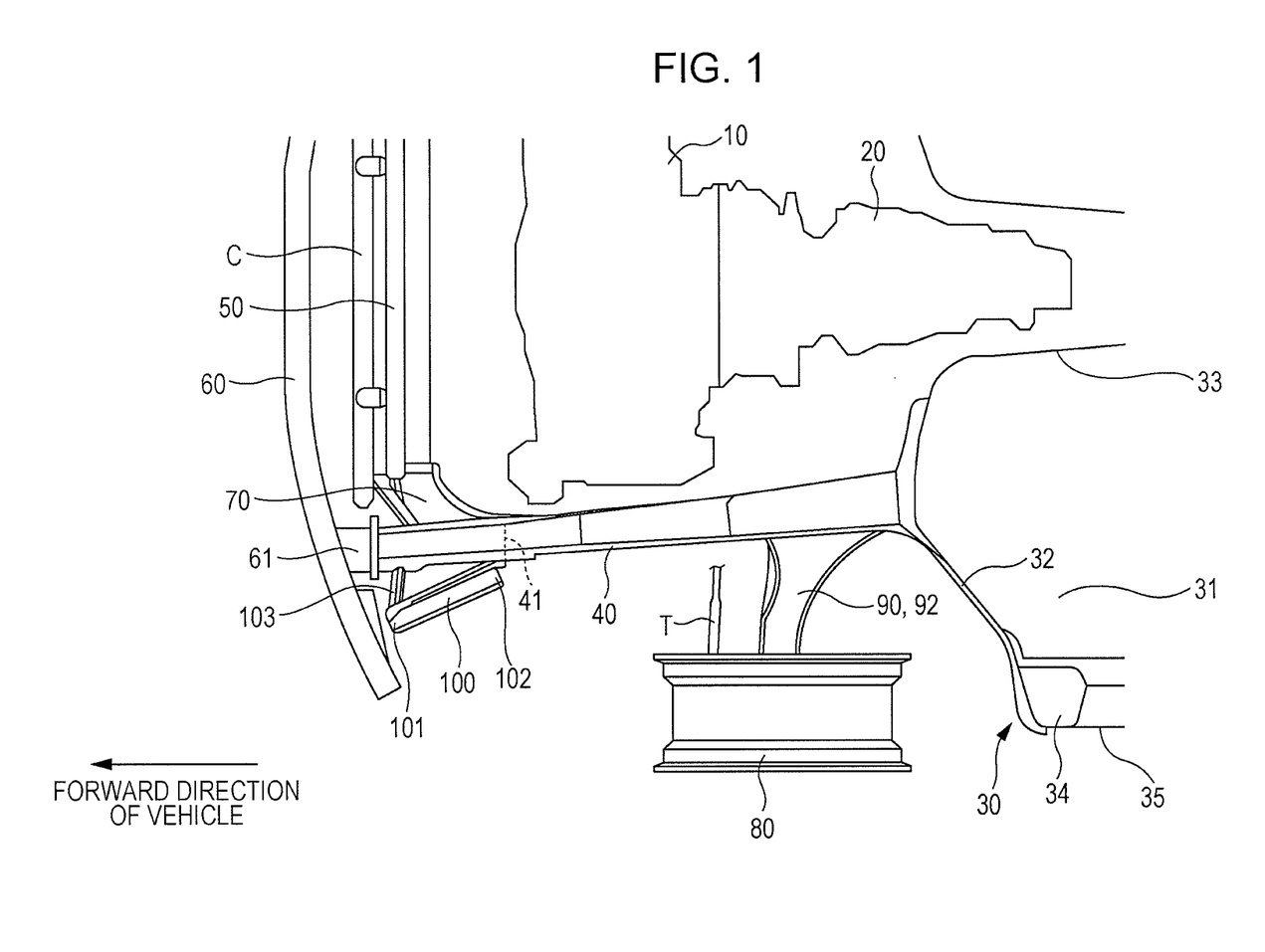
FIG. 1 is a schematic plan view from above of a front vehicle body structure according to Embodiment 1 of the present invention.
Figure 2:
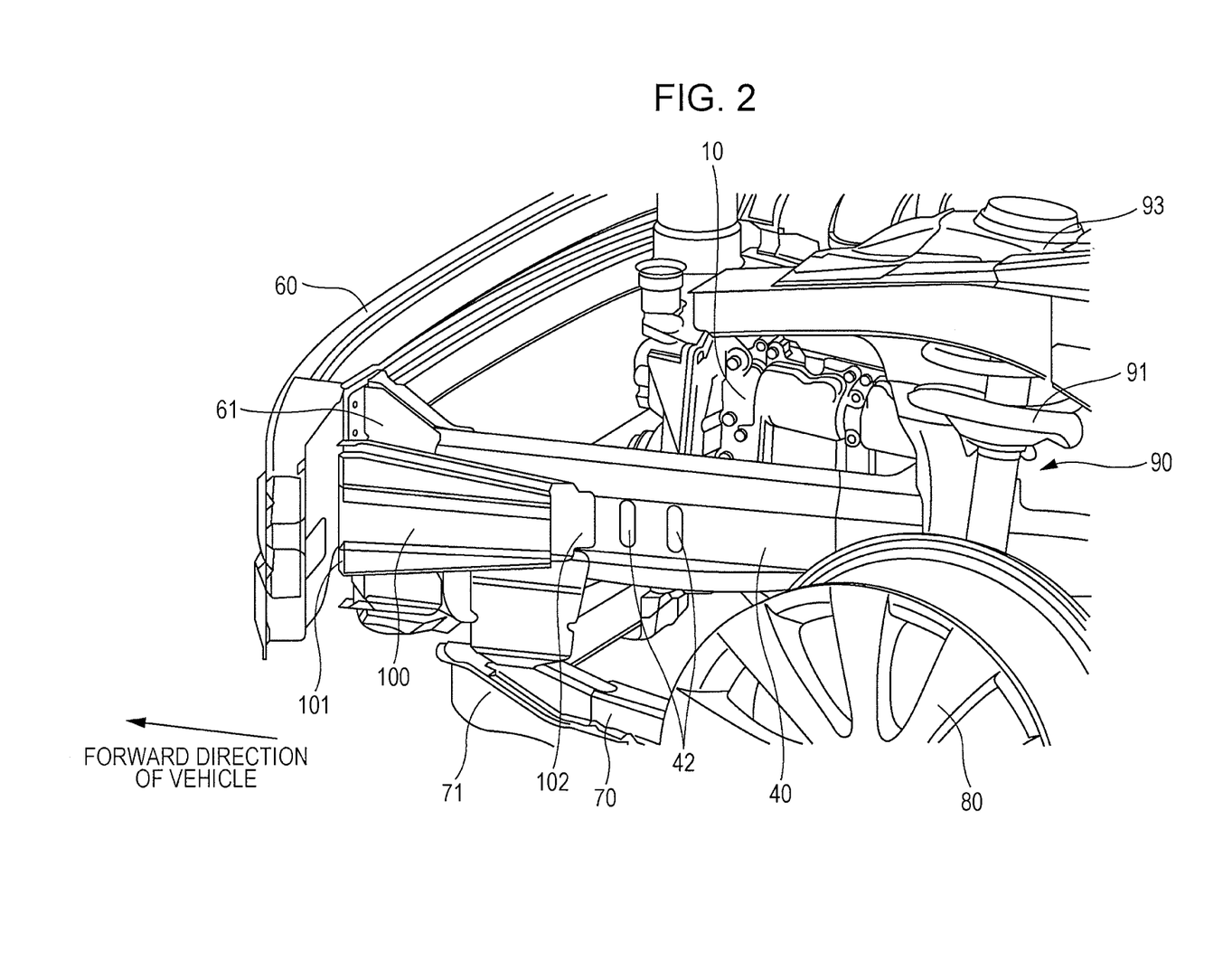
FIG. 2 is a perspective view of the front vehicle body structure according to Embodiment 1 from an obliquely upward and backward position of the outside in the vehicle width direction.

Hereinafter, a front vehicle body structure according to Embodiment 1 in the present invention will be described. The front vehicle body structure according to Embodiment 1 is applied to, for example, the body of an automobile or the like in which a power train such as an engine is mounted at the front of the automobile. FIG. 1 is a schematic plan view from above of a front vehicle body structure according to Embodiment 1. FIG. 2 is a perspective view of the front vehicle body structure according to Embodiment 1 from an obliquely upward and backward position of the outside in the vehicle width direction.

The vehicle includes an engine 10, a transmission 20, a cabin 30, front side frames 40, a radiator panel 50, a bumper beam 60, a front sub frame 70, front wheels 80, and front suspensions 90.

The engine 10 is, for example, a horizontally opposed 4-cylinder gasoline or diesel engine with 4 strokes, which is vertically mounted. The engine 10 has a cylinder head which is disposed at each end (side end of the engine 10) of the cylinder block arranged on both sides of a crankshaft on the left and right.

The transmission 20 comprises a transmission case connected to the rear of the engine 10, the transmission case including a starting device such as a torque converter or a clutch, transmission such as a CVT variator or a speed change gear, an AWD transfer which distributes driving power to the front and rear wheels, the last reduction gear, and a front differential.

The cabin 30 is provided in the central part of a vehicle, in which a driver rides in. The cabin 30 includes a floor panel 31, a toe board 32, a floor tunnel 33, A pillars 34, and side sills 35.

The floor panel 31 constitutes part of the floor of the cabin 30, and is a substantially planar part. The toe board 32 is a surface portion which is disposed to extend upward from the front end of the floor panel 31, and constitutes part of the front surface (a partition wall between the cabin 30 and an engine compartment) of the cabin 30. The floor tunnel 33 is formed by projecting the central part of the floor panel 31 in the vehicle width direction upward (inward of the cabin), and houses the rear portion of the transmission, a propeller shaft, and an exhaust pipe. The A pillars 34 are pillar-shaped structural members which are disposed to project upward from the front ends of the left and right side ends of the floor panel 31. The side sills 35 are beam-shaped structural members which are disposed to extend to the rear of the vehicle from the lower ends of the A pillars 34 along the side ends of the floor panel 31.

The front side frames 40 are structural members which are disposed to project to the front of the vehicle from the toe board 32 of the cabin 30. The front side frames 40 are disposed as a pair on the right and left of the engine 10, and the inner surfaces of the front side frames in the vehicle width direction are disposed to be opposed to and spaced apart from the lateral sides (the tappet covers of cylinder heads in the case of a horizontally opposed engine) of the engine 10. The front side frame 40 has a substantially rectangular cross section when viewed in the fore-and-aft direction of the vehicle.

The radiator panel 50 is a frame-shaped structure configured to support a radiator core C for cooling the coolant of the engine 10 and the capacitor of an air conditioner, and is disposed at the front of the engine 10. The side ends of the radiator panel 50 are fixed to respective front end vicinities of the front side frames 40.

The bumper beam 60 is a beam-shaped member which is disposed inside of the bumper face (not illustrated) provided as an exterior part at the front end of the vehicle body, and extends substantially in the vehicle width direction. The bumper beam 60 is configured to receive a load at the time of a front collision and to transfer the load to the rear of the vehicle body. The bumper beam 60 is formed with an arc-shaped curve having a convex side at the front, conforming to the shape of the bumper face. The bumper beam 60 has bases 61 which are formed projecting from the rear surface of the bumper beam 60. The rear ends of the bases 61 are fixed to the respective front ends of the front side frames 40.

The front sub frame 70 is a structural member which is disposed below the front side frames 40, and to which an engine mount (not illustrated) for supporting the engine 10, and lower arms 92 of the front suspensions 90 are attached. The front sub frame 70 is formed in a rectangular frame shape, and is mounted to the vehicle body by securing a mounting portion 71 (see FIG. 2) and other mounting portion (not illustrated) to the front side frame 40 via a vertically-disposed bolt, the mounting portion 71 being provided at the front end of the front sub frame 70 and the other mounting portion being provided at the rear end of the front sub frame 70.

The front wheel 80 is a front wheel of the vehicle which is formed by mounting a tire on a rim made of aluminum-based alloy, for example. The front wheel 80 is rotatably supported by a hub bearing housing (not illustrated), and can be steered by pushing and pulling a tie rod T disposed forwardly of the axle. The tie rod T is connected to a steering gearbox which is coupled to the steering wheel via a steering shaft, is driven substantially in the vehicle width direction by steering operation of a driver. In FIGS. 1 and 2, a tire is not illustrated, and a rim is not illustrated in FIGS. 3 to 6.

The front suspensions 90 rockably support the hub bearing housing with respect to the vehicle body, the hub bearing housing supporting the front wheel 80. The front suspensions 90 are, for example, MacPherson strut suspensions, and each include a strut 91 and a lower arm 92. The strut 91 (see FIG. 2) is disposed between a strut upper mount 93 which is provided at the upper lateral side in the engine compartment of the vehicle body, and a bracket (not illustrated) provided at the upper portion of the hub bearing housing. The strut 91 is formed by integrating a shock absorber (damper) with a spring as a unit. The lower arm 92 (see FIG. 1) is rotatably provided between the front sub frame 70 and the lower portion of the hub bearing housing.

The vehicle body has a load transfer gusset plate 100 described below. The load transfer gusset plate 100 is disposed in an area outwardly of the front end vicinity of the front side frame 40 in the vehicle width direction. The load transfer gusset plate 100 is formed in a beam shape having a closed cross section, and is disposed to be toe-out with respect to the fore-and-aft direction of the vehicle, so that a front end 101 is outside of a rear end 102 in the vehicle width direction.

The front end 101 of the load transfer gusset plate 100 is disposed to be opposed to and spaced apart from the rear surface of the bumper beam 60. The front end 101 is supported by a stay 103 (see FIG. 1) which projects outwardly from the front side frame 40 in the vehicle width direction. The rear end 102 of the load transfer gusset plate 100 is fastened and fixed to the outer lateral side of the front side frame 40 in the vehicle width direction, for example, via a bolt inserted from the outside in the vehicle width direction. The position of the rear end 102 in the fore-and-aft direction of the vehicle is disposed forward of the midpoint of the engine 10 in the fore-and-aft direction.

The vicinity of the fixed portion of the rear end 102 of the load transfer gusset plate 100 in the front side frame 40 is provided with a separator 41 (see FIG. 1) which substantially partitions and blocks an internal cross section of the front side frame 40.

Beads 42 are formed in an area on the outer lateral side of the front side frame 40 in the vehicle width direction, the area being rearwardly adjacent to the fixed portion of the rear end 102 of the load transfer gusset plate 100. The beads 42 are formed by denting the lateral side of the front side frame 40 so as to be a groove-like shape extending in the vertical direction. The beads 42 are spaced apart in the fore-and-aft direction, and two beads are provided, for example. The beads 42 reduces the stiffness of the front side frame 40 locally, and serve as a trigger to cause the front side frame 40 to bend at the time of a small overlap offset collision, thereby promoting deformation of the front side frame 40. The deformation of the front side frame 40 will be described in detail below.

Hereinafter, the vehicle body deformation process at the time of a small overlap offset collision in the front vehicle body structure according to Embodiment 1 will be described. FIGS. 3 to 6 illustrate deformation of each part of the vehicle body in time series in the case where an object B collides with the outside area of the front side frame 40 in the vehicle width direction.

Figure 3:
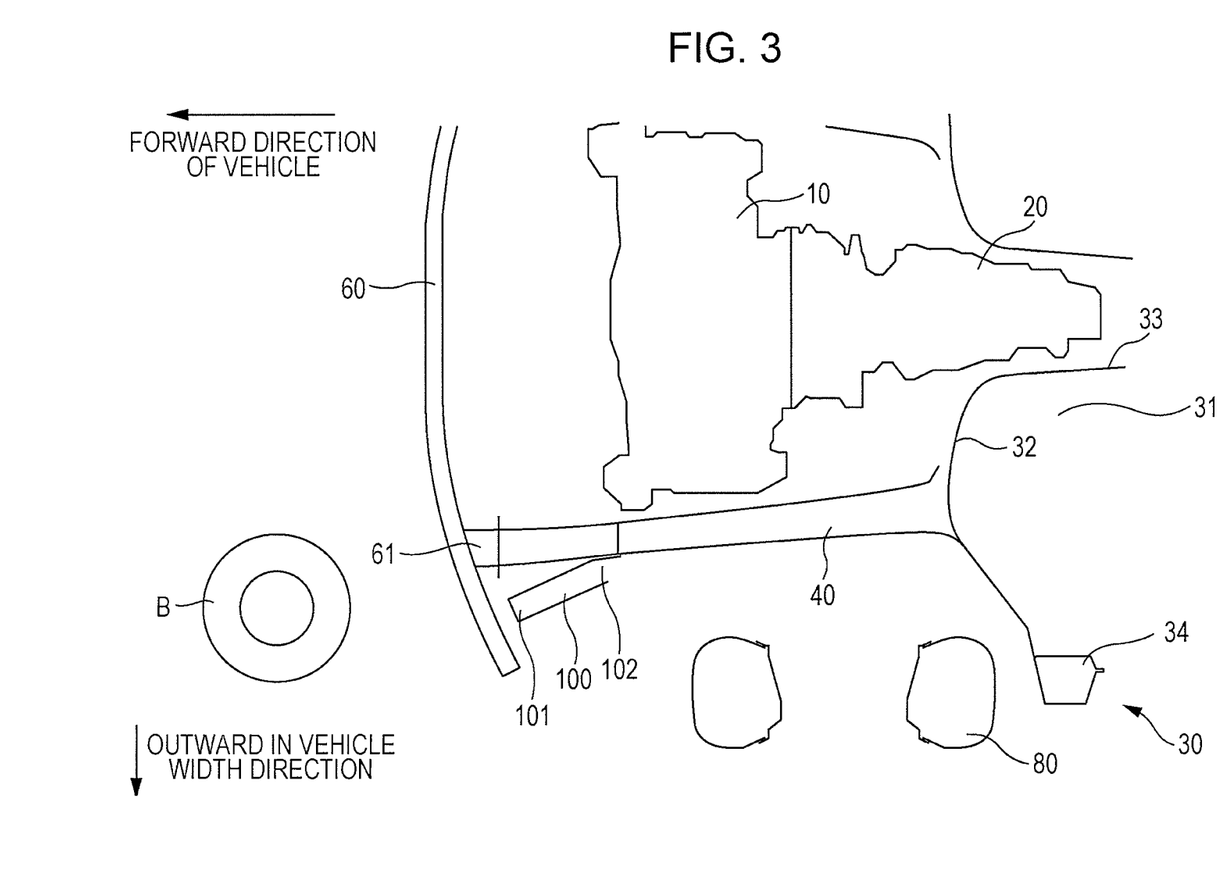
FIG. 3 illustrates the front vehicle body structure according to Embodiment 1 immediately before a small overlap offset collision.
Figure 4:
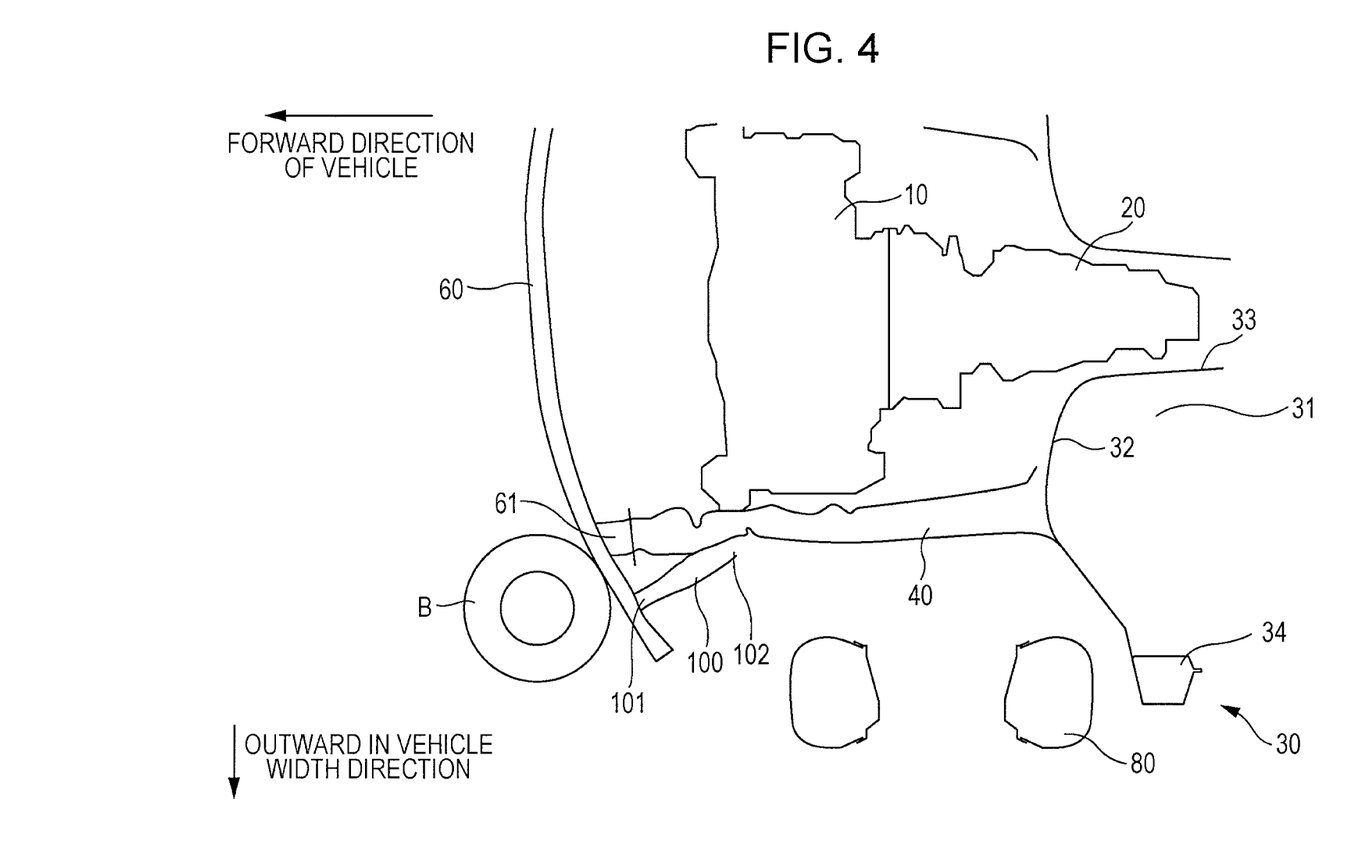
FIG. 4 illustrates deformation of the front vehicle body structure according to Embodiment 1 immediately after the small overlap offset collision.

As illustrated in FIG. 3, the position of the center of the object B in the vehicle width direction is located outside the front end of the front side frame 40, the object B approaching from the front side of the vehicle. The object has a cylindrical shape, which represents a pole such as a utility pole or a signal post. As illustrated in FIG. 4, when the object B collides with the lateral side of the bumper beam 60, the bumper beam 60 transfers a compressive load via the base 61, the compressive load being applied in the axial direction of the front side frame 40. The bumper beam 60 is bent and deformed at an area outside the base 61, in a direction in which the side end of the bumper beam 60 is pushed back. Thus, the rear surface of the bumper beam 60 comes into contact with the front end 101 of the load transfer gusset plate 100, thereby transferring a compressive load in the axial direction of the load transfer gusset plate 100. The load from the load transfer gusset plate 100 is applied to the lateral side of the front side frame 40 through the rear end 102 so as to push the lateral side inward in the vehicle width direction. The pushing load causes the front side frame 40 to start to be deformed at the vicinity of the beads 42 as a bending point, so that front area with respect to the bending point is deformed inward in the vehicle width direction. When the degree of deformation reaches a predetermined level, the front side frame 40 comes into contact with a corresponding opposed portion of the engine 10, i.e., the cylinder head (tappet cover) of the engine 10.

Figure 5:
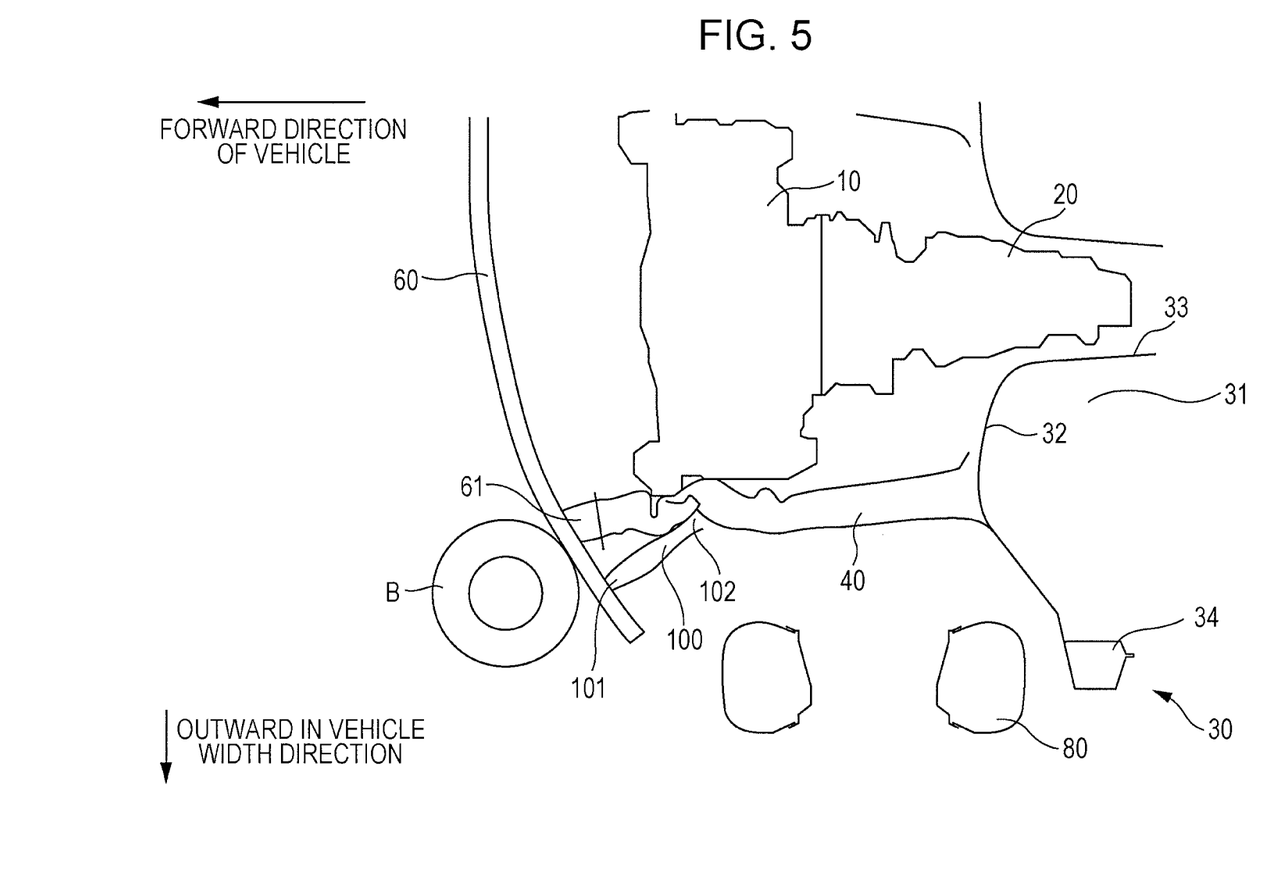
FIG. 5 illustrates deformation of the front vehicle body structure according to Embodiment 1 at the small overlap offset collision after the state of FIG. 4.
Figure 6:
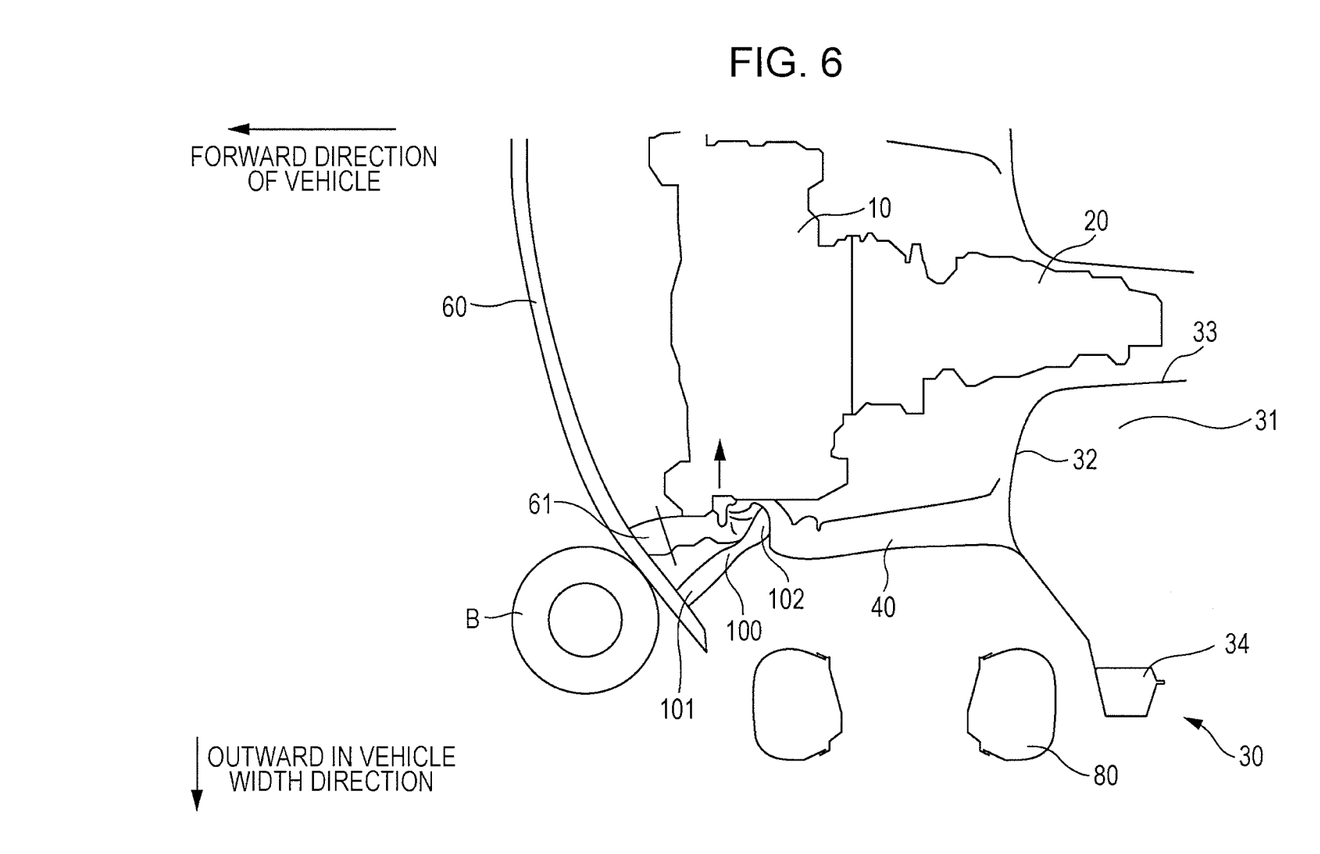
FIG. 6 illustrates deformation of the front vehicle body structure according to Embodiment 1 at the small overlap offset collision after the state of FIG. 5.

Then as illustrated in FIGS. 5 and 6, when the object B further moves backward relative to the vehicle (i.e., the vehicle moves forward relative to the object B), the above-mentioned degree of inward deformation of the front side frame 40 in the vehicle width direction further increases. Accordingly, the front side frame 40 pushes and displaces the engine 10 toward the opposite side in the vehicle width direction (the side which has not collided with the object B). In the above process, an undamaged portion in the front end of the front side frame 40 causes the engine 10 to be pushed outward in the vehicle width direction with the axial force. In this manner, the engine 10, which is a heavy component of the vehicle, is pushed to the opposite side in the vehicle width direction, and the moving direction of the vehicle is changed into a direction which allows the vehicle to avoid a collision with the object B. Thus, a transfer load to the pillar 34 of the cabin 30 and the side sill 35 is reduced. In addition, the front side frame 40 itself exhibits a function of absorbing energy in the above-described deforming process.

As described above, the following effects can be obtained according to Embodiment 1.

(1) A load transferred from the load transfer gusset plate 100 to the front side frame 40 at the time of a small overlap offset collision causes the front side frame 40 to be deformed, and thus the engine 10 is pushed by the front side frame 40 toward the other front side frame 40 on the opposite side. The engine 10, i.e., a heavy load is pushed, and the driving direction of the vehicle is changed to a direction in which the vehicle moves away from the object B, and thus an impact load to the cabin 30 is reduced. For example, in CAE analysis performed by the present inventor, it has been verified that a transferred load to the side sill is reduced approximately by half. Furthermore, assuming that a comparable performance is achieved in a conventional technology which improves the performance against small overlap offset collision by reinforcing the cabin, an increase in weight of an existing vehicle body can be reduced approximately by ⅔, for example, and thus providing advantageous running performance, fuel consumption, and cost.

(2) The amount of energy transferred to the other parts of the vehicle body can be reduced by the front side frame 40 absorbing energy at the time of bending of the front side frame 40.

(3) The reproducibility of the above-described bending and deformation of the front side frame 40 is improved by forming the bead 42 in the front side frame 40, and thus the above-described effect can be reliably obtained.

(4) A loss of the load transferred from a load transfer gusset 100 to the engine 10 via the front side frame 40 is reduced by providing the front side frame 40 with the separator 41, and thus the engine 10 can be reliably pushed.

(5) Because a space is provided between the front end 101 of the load transfer gusset 100 and the rear surface of the bumper beam 60, an occurrence of damage is prevented by transferring an impact load from the load transfer gusset 100 to the front side frame 40 at the time of a light collision, and thus a collision repair can be easily made and the repair cost can be reduced.

Embodiment 2

Figure 7:
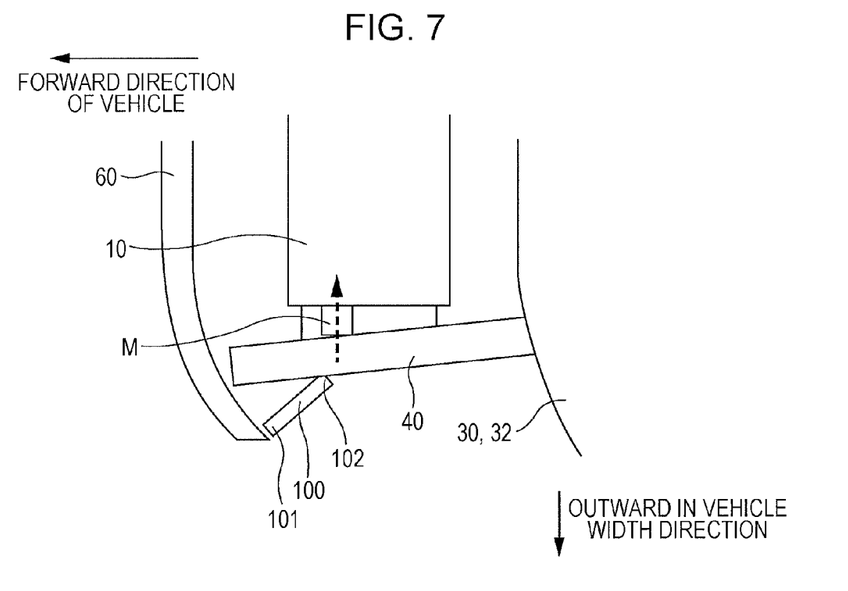
FIG. 7 is a schematic plan view illustrating the configuration of a front vehicle body structure according to Embodiment 2 of the present invention.

Hereinafter, a front vehicle body structure according to Embodiment 2 of the present invention will be described. In the following description of Embodiment 2, substantially the same portions as those of conventional embodiments are labeled with the same reference symbols, and description is omitted and different points are mainly described. FIG. 7 is a schematic plan view illustrating the configuration of a front vehicle body structure according to Embodiment 2. In Embodiment 2, the engine 10 is, for example, a horizontally-mounted series or V-type engine, and the ends thereof in the vehicle width direction are supported by an engine mount M which is disposed to extend inward in the vehicle width direction from the front side frame 40.

In Embodiment 2, the position of the rear end 102 of the load transfer gusset 100 in the fore-and-aft direction of the vehicle is located at substantially the same position of the engine mount M or at a forward position adjacent to the engine mount M. In the above-described Embodiment 2 also, the front side frame 40 is bent and deformed at the time of a small overlap offset collision, so that the engine 10 is pushed via the engine mount M toward the opposite side in the vehicle width direction, and thus the effect substantially the same as the above-described effect of Embodiment 1 can be obtained.

Embodiment 3

Figure 8:
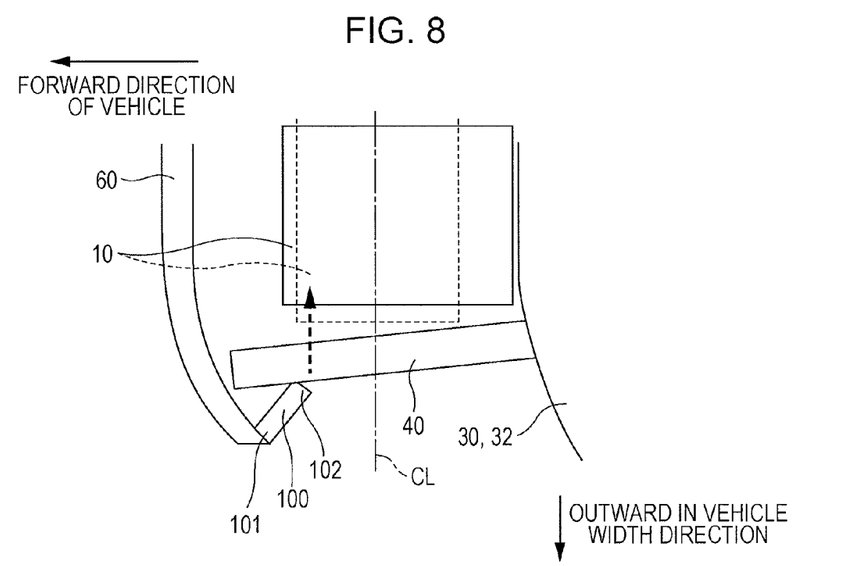
FIG. 8 is a schematic plan view illustrating the configuration of a front vehicle body structure according to Embodiment 3 of the present invention.

Hereinafter, a front vehicle body structure according to Embodiment 3 of the present invention will be described. FIG. 8 is a schematic plan view illustrating the configuration of a front vehicle body structure according to Embodiment 3. In Embodiment 3, the engine 10 is a horizontally-mounted series or V-type engine, and is supported by an engine mount which is disposed at a position other than the front side frame 40. In Embodiment 3, the fixed position of the front side frame 40 to the rear end 102 of the load transfer gusset 100 is located forward relative to a center CL of the engine 10 in the fore-and-aft direction. In the above-described Embodiment 3 also, the front side frame 40 is bent and deformed at the time of a small overlap offset collision, so that the engine 10 is pushed toward the opposite side in the vehicle width direction, and thus the effect substantially the same as the above-described effect of Embodiment 1 can be obtained. Even in the case of a horizontally-mounted engine with no engine mount M in the front side frame 40 as illustrated by a dashed line in FIG. 8, the rear end 102 of the load transfer gusset 100 is disposed forward of the center of the engine in the fore-and-aft direction, and thus substantially the same effect can be obtained.

MODIFICATION

The present invention is not limited to the above-described embodiments, and various modifications and changes may be made. Modified or changed embodiments are also in the technical scope of the present invention. The shapes, structures, materials, and arrangement of the members that constitute the front vehicle body structure are not limited to the configuration of the above-described embodiment, and may be changed as needed. For example, each of the embodiments has a structure in which the power unit, i.e., the engine is pushed by the front side frame, however, for example, in the case where the engine is a horizontally-mounted power train, the transmission adjacent to the front side frame may be pushed. The power unit is not limited to an engine or a transmission. For example, the power unit may be an electric drive motor, a control unit case, or the like. The load transfer member is not limited to the above-described gusset made of a sheet metal. For example, the load transfer member may be formed using a pipe material, or any material such as a composite material, or may be any product such as a cast, forging made of an aluminum alloy or the like. In the embodiments, a space is provided between the bumper beam and the load transfer member in consideration of a light collision, however, the bumper beam and the load transfer member may be directly connected together. Optionally, the front end of the load transfer member may be disposed immediately after the bumper face so as to transfer a load not through the bumper beam.

What is claimed is:

1. A front vehicle body structure comprising:
   a front side frame disposed at a front of a vehicle body on each side of a power unit in a vehicle width direction, the front side frame extending substantially in a fore-and-aft direction of the vehicle; and
   a load transfer member disposed outside in the vehicle width direction, near a front end of the front side frame, a rear end of the load transfer member being fixed to an outer lateral side of the front side frame in the vehicle width direction at a fixed position, the fixed position being located forwardly of a center position of the power unit in the fore-and-aft direction, a front end of the load transfer member being disposed forwardly of the rear end in the fore-and-aft direction and outwardly of the rear end in the vehicle width direction, wherein
   the front end of the load transfer member is disposed to be opposed to, and spaced apart from, a rear surface of a front bumper beam, and
   an impact load to the front end of the load transfer member in a rearward direction of the vehicle causes a vicinity area of the fixed position of the front side frame to the rear end to be displaced in a direction in which the vicinity area approaches the power unit.

2. The front vehicle body structure according to claim 1, wherein the front side frame has a low-stiffness portion which is formed rearwardly of the fixed position and configured to allow the front side frame to bend easily, the rear end of the load transfer member being fixed at the fixed position to the lateral outer side of the front side frame in the vehicle width direction.

3. The front vehicle body structure according to claim 1, further comprising a mounting base which is provided across the power unit and the front side frame and configured to support the power unit, the mounting base being located at substantially the same position as the rear end of the load transfer member in the fore-and-aft direction of the vehicle.

4. The front vehicle body structure according to claim 2, further comprising a mounting base which is provided across the power unit and the front side frame and configured to support the power unit, the mounting base being located at substantially the same position as the rear end of the load transfer member in the fore-and-aft direction of the vehicle.

5. The front vehicle body structure according to claim 1, wherein a separator which substantially blocks an inside of the front side frame is provided at a position adjacent to the fixed position, the rear end of the load transfer member being fixed at the fixed position to the lateral outer side of the front side frame in the vehicle width direction.

6. The front vehicle body structure according to claim 2, wherein a separator which substantially blocks an inside of the front side frame is provided at a position adjacent to the fixed position, the rear end of the load transfer member being fixed at the fixed position to the lateral outer side of the front side frame in the vehicle width direction.

7. The front vehicle body structure according to claim 1, further comprising a front sub frame fixed to a lower side of the front side frame, a fixed position of the front side frame to the rear end of the load transfer member being located rearward relative to a fixed position at a front side of the front sub frame to the front side frame.

8. The front vehicle body structure according to claim 2, further comprising a front sub frame fixed to a lower side of the front side frame, a fixed position of the front side frame to the rear end of the load transfer member being located rearward relative to a fixed position at a front side of the front sub frame to the front side frame.

9. A front vehicle body structure comprising:
a front side frame disposed at a front of a vehicle body on each side of a power unit in a vehicle body width direction, the front side frame extending substantially in a fore-and-aft direction of the vehicle body; and
a load transfer member disposed outside the front side frame in the vehicle body width direction, near a front end of the front side frame, a rear end of the load transfer member being fixed to an outer lateral side of the front side frame in the vehicle body width direction at a fixed position, the fixed position being located forwardly of a center position of the power unit in the fore-and-aft direction, a front end of the load transfer member being disposed forwardly of the rear end of the load transfer member in the fore-and-aft direction and outwardly of the rear end of the load transfer member in the vehicle body width direction, wherein
the front vehicle body structure is configured such that, upon input of a predetermined impact load to the front end of the load transfer member in a rearward direction of the vehicle body, a displacing region of the front side frame located at or rearward of the fixed position will be displaced toward a lateral side of the power unit, and the front side frame has a low-stiffness portion rearward of the fixed position, the low-stiffness portion being configured to promote a bending of the front side frame thereabout.

10. The front vehicle body structure according to claim 9, wherein the front vehicle body structure is configured such that, upon input of a predetermined impact load to the front end of the load transfer member in a rearward direction of the vehicle body, the displacing region of the front side frame will push against the lateral side of the power unit to push the power unit toward the opposite front side frame.

11. The front vehicle body structure according to claim 9, wherein the front vehicle body structure is configured such that, upon input of a predetermined impact load to the front end of the load transfer member in a rearward direction of the vehicle body, the displacing region of the front side frame will push against a lateral side of a mounting base supporting the power unit to push the power unit toward the opposite front side frame.

12. The front vehicle body structure according to claim 9, wherein the front end of the load transfer member is positioned in an opposing and spaced relationship with a rear surface of a front bumper beam.

13. The front vehicle body structure according to claim 9, wherein the displacing region of the front side frame is located further rearward of the fixed position.

14. The front vehicle body structure according to claim 9, wherein the separator substantially partitions an internal cross-section of the front side frame.

15. The front vehicle body structure according to claim 9, wherein the separator blocks an internal cross-section of the front side frame.

16. A front vehicle body structure comprising:
a front side frame disposed at a front of a vehicle body on each side of a power unit in a vehicle body width direction, the front side frame extending substantially in a fore-and-aft direction of the vehicle body; and
a load transfer member disposed outside the front side frame in the vehicle body width direction, near a front end of the front side frame, a rear end of the load transfer member being fixed to an outer lateral side of the front side frame in the vehicle body width direction at a fixed position, the fixed position being located forwardly of a center position of the power unit in the fore-and-aft direction, a front end of the load transfer member being disposed forwardly of the rear end of the load transfer member in the fore-and-aft direction and outwardly of the rear end of the load transfer member in the vehicle body width direction,
wherein the front vehicle body structure is configured such that, upon input of a predetermined impact load to the front end of the load transfer member in a rearward direction of the vehicle body, a displacing region of the front side frame located at or rearward of the fixed position will be displaced toward a lateral side of the power unit, and
the front vehicle body structure further comprising a separator positioned adjacent to the rear end of the load transfer member and configured to enhance the stiffness of the front side frame at the displacing region for promoting the transfer of an impact load from the load transfer member to the power unit.

17. The front vehicle body structure according to claim 16, wherein the separator substantially partitions an internal cross-section of the front side frame.

18. The front vehicle body structure according to claim 16, wherein the separator blocks an internal cross-section of the front side frame.

19. The front vehicle body structure according to claim 16, wherein the front end of the load transfer member is positioned in an opposing and spaced relationship with a rear surface of a front bumper beam.

20. The front vehicle body structure according to claim 16, wherein the displacing region of the front side frame is located rearward of the fixed position.

21. The front vehicle body structure according to claim 16, wherein the front vehicle body structure is configured such that, upon input of a predetermined impact load to the front end of the load transfer member in a rearward direction of the vehicle body, the displacing region of the front side frame will push against a lateral side of a mounting base supporting the power unit to push the power unit toward the opposite front side frame.

* * * * *